W. F. SWEET.
BLOAT NEEDLE.
APPLICATION FILED JULY 21, 1911.
1,045,906.
Patented Dec. 3, 1912.
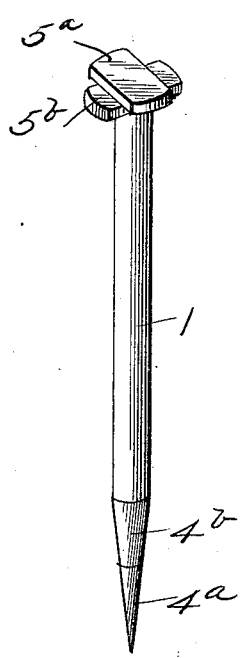
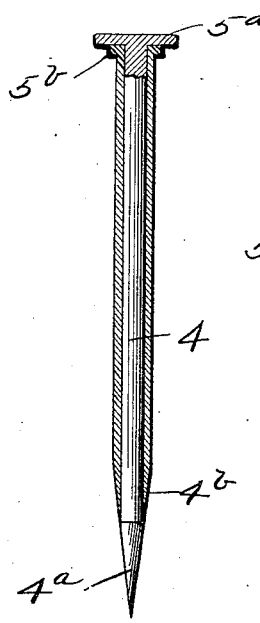
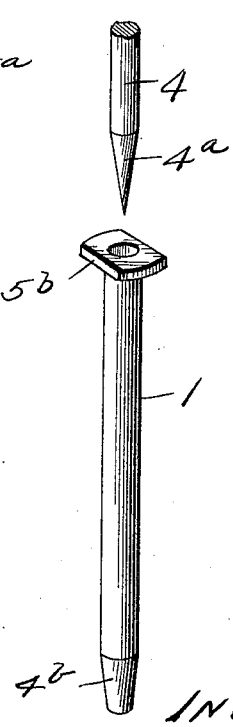

UNITED STATES PATENT OFFICE.

WELCOME F. SWEET, OF ST. LOUIS, MISSOURI.

BLOAT-NEEDLE.

1,045,906.  Specification of Letters Patent.  Patented Dec. 3, 1912.

Application filed July 21, 1911. Serial No. 639,829.

*To all whom it may concern:*

Be it known that I, WELCOME F. SWEET, a citizen of the United States, residing at St. Louis, State of Missouri, have invented a certain new and useful Improvement in Bloat-Needles, of which the following is a full, clear, and exact description, reference being had to the accompanying drawings, in which—

Figure 1 is a perspective view of my improved bloat needle. Fig. 2 is a vertical section taken through the center of my improved needle. Fig. 3 is a perspective view with the trocar withdrawn from the cannula.

My invention relates generally to surgical instruments, and more particularly to instruments to be used by veterinaries and others for the relief of bloat in cattle and other animals. The ailment commonly known as bloat is frequently met with in animals particularly cattle, which ailment is produced by the formation of gas in the stomach, resulting from over eating particularly of green food, and where bloat occurs it must be relieved quickly in order to avert the death of the afflicted animal.

It is the purpose of my invention to provide a simple, inexpensive, device, combining a trocar and cannula which may be readily inserted through the skin of the animal and into the stomach, and after the trocar has been withdrawn the gas will readily escape through the cannula thereby relieving the bloated animal.

My invention consists in a short metal tube forming the cannula, one end of which is provided with a head to prevent the tube from being wholly forced beneath the skin of the animal, and which tube is combined with a trocar of such size as to fit snugly within the tube with the pointed end of the trocar projecting beyond the end of said tube.

Referring by numerals to the accompanying drawings 1 designates a tube that forms the cannula of my improved needle and adapted to fit snugly within said cannula is a trocar 4 the lower end of which is provided with a gradually tapered or elongated conical point 4$^a$. The lower end of the cannula is ground off and tapered as designated by 4$^b$ to correspond with the taper of the pointed lower end of the trocar. By such construction the pointed end 4$^a$ can be readily forced through the skin and the fibers of said skin will gradually stretch to permit the body portion of the needle to be inserted the full length into the animal. In this form of device the trocar is provided with a cross head 5$^b$, comprising a pair of oppositely disposed lugs or ears projecting outwardly from the upper end of said trocar. The cannula has a corresponding cross head 5$^a$ comprising a pair of ears or lugs projecting outwardly from opposite sides of the upper end of the cannula and when the parts are assembled the head 5$^b$ is arranged at right angles to the head 5$^a$ thereby readily permitting the head 5$^b$ to be held stationary when the trocar is withdrawn by engaging the head 5$^a$ with the thumb and forefinger.

In the use of my improved bloat needle, the cannula containing the trocar is forced the full length into the animal, thereby puncturing the wall of the stomach, and the trocar is now withdrawn from the cannula, thereby permitting the gas formed in the stomach to discharge through the cannula.

A bloat needle of my improved construction is comparatively simple, may be manufactured at little cost, and the forward end of the trocar is formed in such a manner as to leave a comparatively small wound when forced through an animal's skin.

I claim:

1. A device of the class described comprising a cannula, a cross head on the upper end thereof, a trocar adapted to fit snugly within the cannula, and having a pointed end that projects beyond the lower end of the cannula, and a cross head on the upper end of the trocar.

2. A bloat needle comprising a cannula, a pair of oppositely disposed ears projecting outwardly from the upper end of said cannula, a trocar adapted to fit snugly within the cannula, and provided with a pointed lower end, and a pair of oppositely disposed ears integral with and projecting outwardly from the upper end of said trocar.

In testimony whereof I hereunto affix my signature in the presence of two witnesses, this 23d day of June, 1911.

WELCOME F. SWEET.

Witnesses:
M. P. SMITH,
E. L. THOMAS.

Copies of this patent may be obtained for five cents each, by addressing the "Commissioner of Patents, Washington, D. C."